United States Patent Office 3,011,348
Patented Dec. 5, 1961

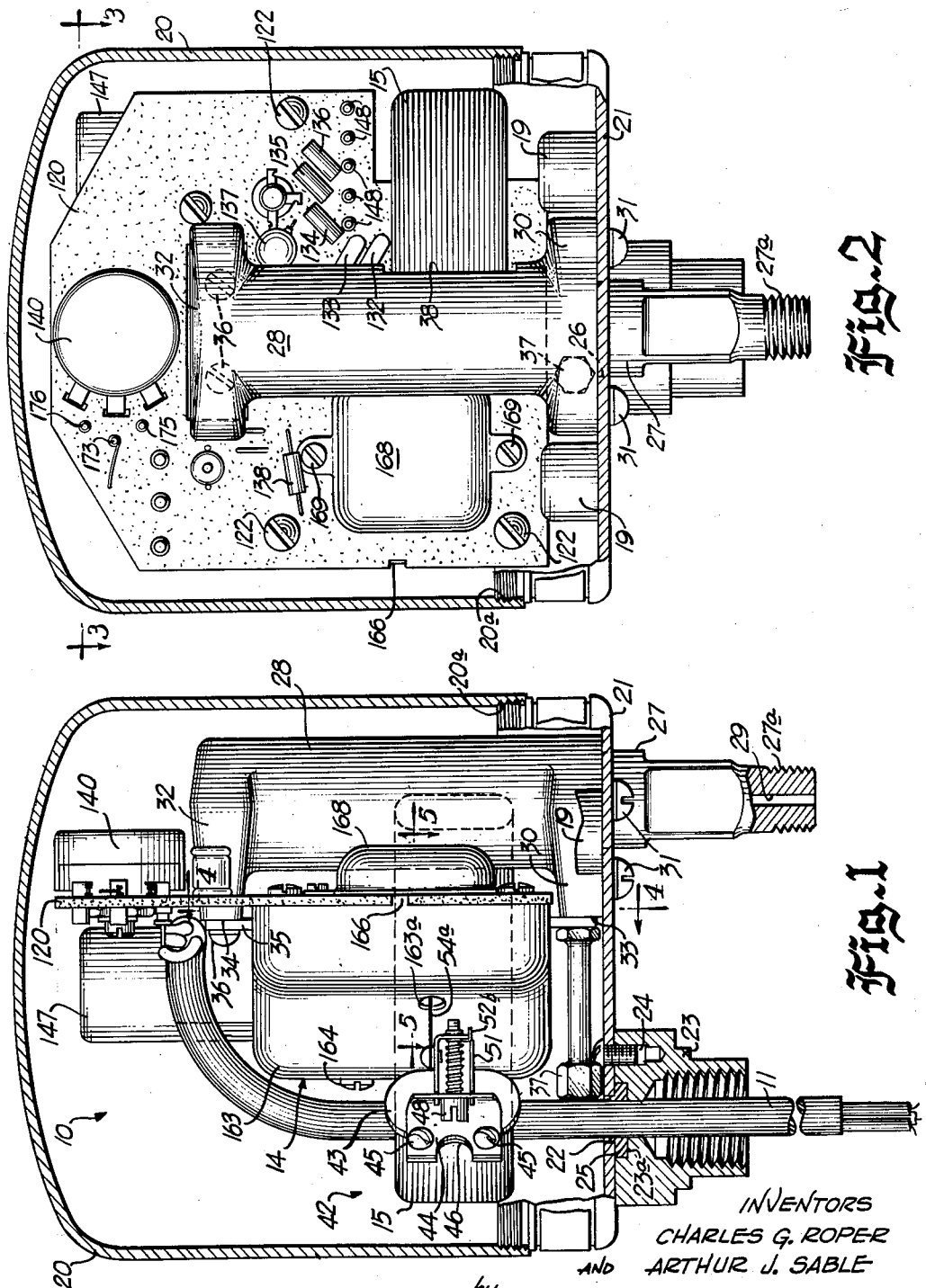

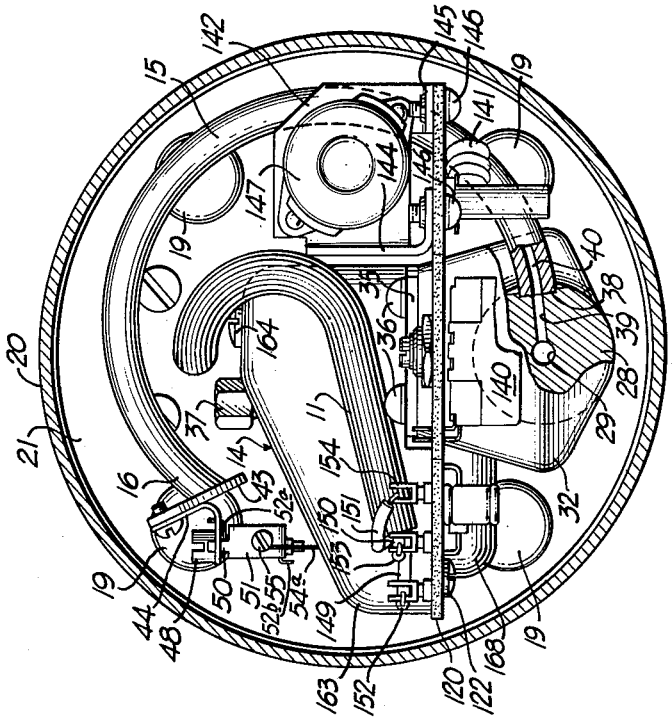

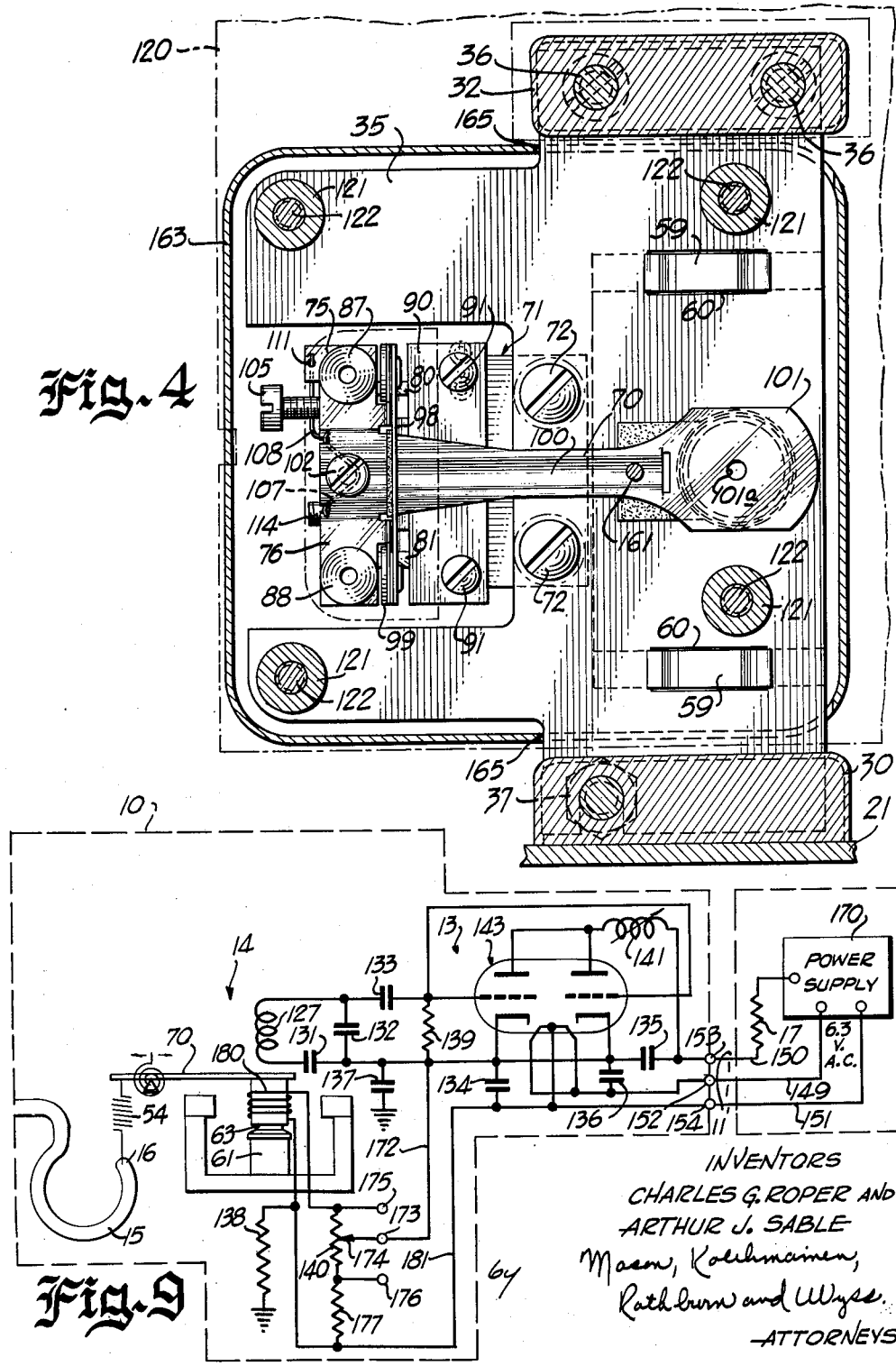

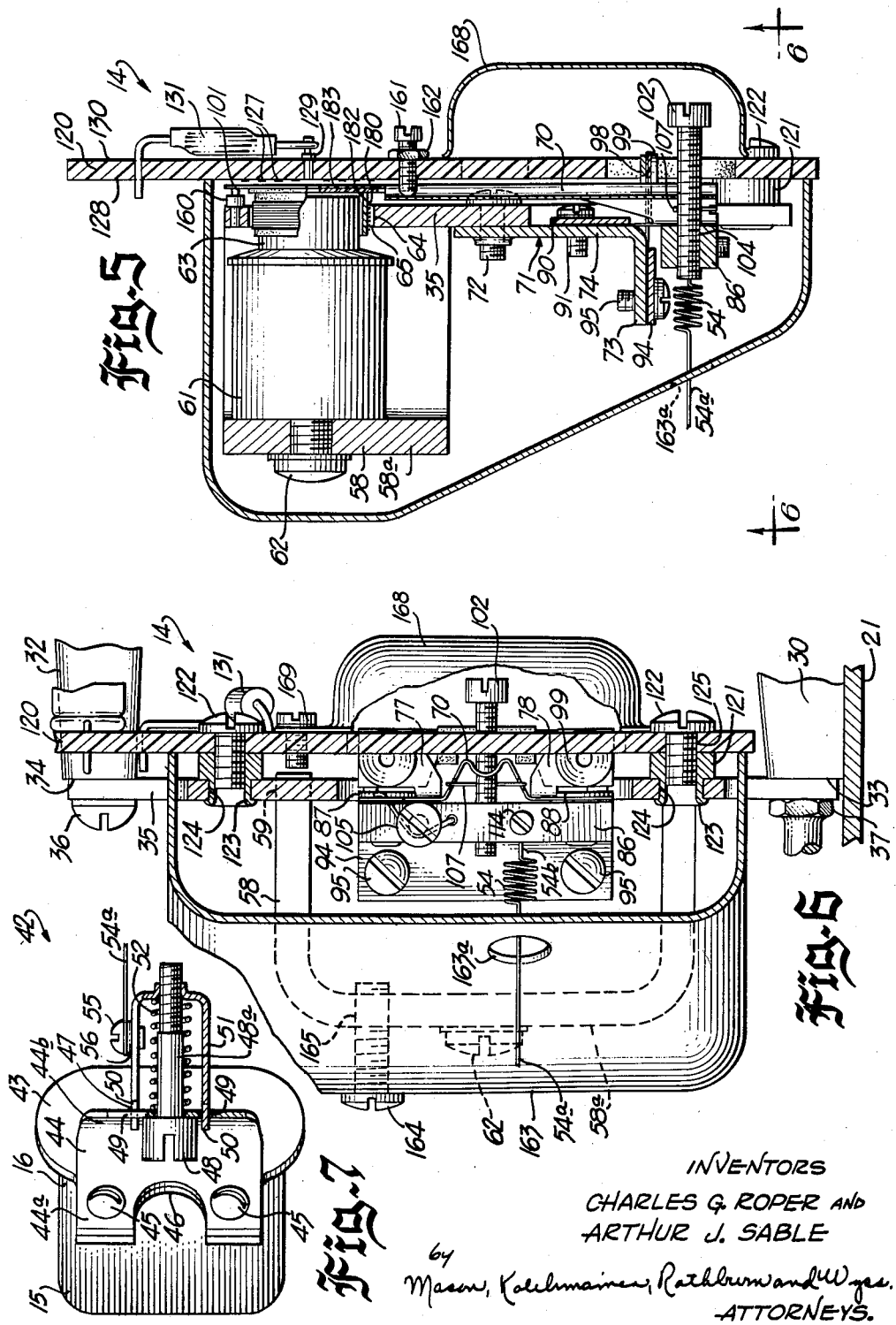

3,011,348
ELECTROMECHANICAL BALANCE UNIT AND CONTROL SYSTEM EMPLOYING SAME
Charles G. Roper, Fairfield, and Arthur J. Sable, Milford, Conn., assignors, by mesne assignments, to Robertshaw-Fulton Controls Company, Richmond, Va., a corporation of Delaware
Filed Aug. 30, 1957, Ser. No. 681,318
9 Claims. (Cl. 73—398)

The present invention relates generally to an electromechanical transmitter unit and to a control system employing this unit and the invention relates more particularly to an electromechanical transmitter unit for developing a direct current output signal in response to an input which varies in proportion to a measured variable.

In systems of the type with which the present invention is concerned the physical displacements of a member in response to changes in such variables as temperature, pressure, fluid flow and the like are converted into electrical signals directly proportional to such changes and these signals are, in turn, employed to excite indicating devices, to drive appropriate recording apparatus or to actuate control devices for maintaining the variables either at desired values or within predetermined limits. One of the principal objects of the present invention is to provide a new and improved transmitter unit for converting the aforementioned physical displacements into corresponding electrical signals.

It is a further object of the present invention to provide a new and improved transmitter unit employing a minimum number of moving parts which are relatively free from friction, thereby to increase the sensitivity of the unit and to improve the accuracy of the electrical signals developed.

Another object of the present invention is to provide a new and improved electromechanical transmitter unit which is compact and rugged in construction and can be manufactured at relatively low cost on a mass production basis.

Still another object of the invention is to provide a new and improved transmitter unit according to the preceding object which unit is constructed from a number of integral sub-units susceptible to separate fabrication and assembly, whereby these sub-units can be assembled or disassembled relatively easily in order to facilitate maintenance and repair of the transmitter unit by permitting removal of the sub-units for replacement or service.

A still further object of the invention is to provide a transmitter unit having increased sensitivity which is not seriously affected by changes in the ambient of the unit such as temperature variations and the like.

It is also an object of the present invention to provide a transmitter unit employing a novel zero adjusting mechanism for applying a force to the balance beam of the unit, as contrasted with the more common arrangement wherein the zero adjusting mechanism is effective to apply a motion to the beam.

Another object of the present invention is to provide a zero adjusting mechanism according to the preceding object wherein the force is applied through a spring connected between the physically displaceable member and the balance beam, thereby avoiding friction between the parts and, as a consequence, further increasing the sensitivity of the transmitter unit.

It is likewise an object of the present invention to provide a new and improved control system employing the transmitter unit referred to above which system is characterized by the disposition of a power supply for the transmitter unit and a load, such as the recording, indicating or control equipment previously mentioned, at a point remote from the transmitter unit.

Another object of the invention is to provide a control system according to the preceding object wherein a cable containing a minimum number of conductors is connected between the remote point and the transmitter unit.

A further object of the invention is to provide a control system according to the preceding object wherein the cable carries direct current energizing potential from the remote point to the circuit in the transmitter unit and also carries direct current signals developed by the transmitter unit to the remote point for use in operating the indicating, recording or control equipment referred to previously.

In accordance with the present invention the foregoing and other objects are realized by providing a transmitter unit employing a Bourdon tube having a tip portion which is physically displaced in response to changes in variables of the type mentioned above such as temperature, pressure, fluid flow and the like. The described displacement of the tube tip is employed to transmit a force through a zero adjusting mechanism to a balance beam assembly which is generally similar to the electromechanical balance unit described and claimed in copending application Serial No. 616,485 of Edgar S. Gilchrist and Arthur J. Sable, filed October 17, 1956, now U.S. Patent 2,913,672, and assigned to the same assignee as the present invention. Deflection of the beam of the balance unit in response to the changes in the input variable functions to alter the inductance of a planar inductor and the described change in inductance, in turn, alters the tuning of an oscillator circuit in the transmitter unit. A portion of the output current of the oscillator is fed back to a feedback coil which is mounted on the balance beam and is so positioned in a magnetic field that a force is exerted on the beam in opposition to the input force. Changes in the tuning of the oscillator circuit induce corresponding variations in the plate current flow from the oscillator through a cable to a load device positioned at the remote unit where the oscillator plate current is used to drive indicating, recording or control equipment as indicated above. The cable is also employed to carry energizing potential from the remote point to the oscillator circuit.

Further objects and advantages of the present invention reside in certain features relating to the construction and assembly of the component parts making up the transmitter unit among which features may be particularly mentioned the manner in which the Bourdon tube, the zero adjust assembly, the electro-mechanical balance unit and the printed circuit board carrying the oscillator and its associated circuit components are mounted upon a single massive column in such manner that the assembly produced is extremely rugged and is not adversely affected by shock and vibrations, by relative movement of parts caused by temperature variations or by stresses acting upon the transmitter unit as a result of the piping connections. Also worthy of mention as important features of the present invention are the manner in which the zero adjusting mechanism is assembled between the tip of the Bourdon tube and the balance unit and the details of construction of the zero adjusting mechanism.

The invention, both as to its organization and method of operation, together with further objects and advantages thereof, will best be understood by reference to the following specification taken in conjunction with the accompanying drawings wherein:

FIG. 1 is a plan view of an electromechanical transmitter unit embodying the features of the present invention with the cover of this unit being broken away in order to illustrate certain structural details of the unit;

FIG. 2 is an elevational view looking from the right side of the unit as viewed in FIG. 1 with the cover again being broken away in order to illustrate certain other structural details of the unit;

FIG. 3 is a top plan view taken along a line substantially corresponding to the line 3—3 in FIG. 2 but assuming that the latter shows the entire structure of the transmitter unit;

FIG. 4 is an enlarged, fragmentary, sectional view taken along a line substantially corresponding to the line 4—4 in FIG. 1;

FIG. 5 is an enlarged fragmentary, sectional view taken along a line substantially corresponding to the line 5—5 in FIG. 1 and illustrating particularly the construction of the electromechanical balance unit;

FIG. 6 is a sectional view taken along a line substantially corresponding to the line 6—6 in FIG. 5 assuming, of course, that the latter shows the entire balance unit;

FIG. 7 is an enlarged plan view showing the construction of the zero adjusting mechanism employed in the transmitter unit shown in FIG. 1;

FIG. 8 is an exploded view showing the mounting arrangement for the deflectable beam of the balance unit employed in the transmitter shown in FIG. 1; and FIG. 9 is a partially diagrammatic, partially schematic view showing a control system employing the transmitter unit shown in FIG. 1 together with a remote unit which includes a power supply for supplying energizing potential to the oscillator circuit and also includes a load responsive to the signals developed by the transmitter unit.

Referring now to the drawings and particularly to FIG. 9 thereof a transmitter unit indicated generally by the reference numeral 10 is there shown for supplying signals via a multi-conductor cable 11 to a remote station indicated by the reference numeral 12. The transmitter unit 10 includes a tuned plate, tuned grid oscillator circuit 13 cooperating with an electromechanical balance unit or assembly 14, to be described in greater detail hereinafter, to transform the physical movements of a displaceable member, which in the form of the invention illustrated in the drawings comprises a Bourdon tube 15, into electrical signals for transmission over the cable 11 to the remote unit 12. The tip 16 of the Bourdon tube is moved in response to variations in temperature, pressure or fluid flow in conventional manner and these movements are employed to actuate the balance unit 14 in order to vary the tuning of the oscillator circuit 13, thereby causing corresponding variations in the plate current flow from the oscillator to a load 17 located at the remote unit. As indicated above the load 17 may take the form of indicating devices, recording apparatus or control equipment such as automatically operable valves or relays for maintaining the input conditions sensed by the Bourdon tube 15 at any desired value or for maintaining these conditions within predetermined upper and lower limits.

The transmitter 10, as illustrated in FIGS. 1 and 2 of the drawings, includes a substantially cup-shaped upper cover member 20 having its open end internally threaded as indicated at 20a in order to accommodate an externally threaded portion of a base member 21 which is thus secured to the upper cover 20 to form a casing enclosing the component parts of the transmitter unit 10.

The base member 21 may be provided with integral mounting members 19 which extend into the casing and have tapped bores centrally thereof for the purpose of receiving screws (not shown) for mounting the transmitter unit upon or near the equipment which it is monitoring. The base member 21 is also provided with an aperture 22 through which emerges the cable 11. Specifically, the cable passes through a conduit fitting 23 which is secured to the underside of the base member 21 by means of machine screws 24 or the like and which includes an axial opening therethrough for accommodating the cable 11. A sealing ring 25 preferably encircles the cable 11 and is seated against the underside of the base 21 within a recess 23a in the fitting 23 in order to seal the casing for the transmitter unit 10 at the point of egress of the cable. The base member 21 is further provided with a circular opening 26 for accommodating a depending boss 27 formed upon a mounting column identified by the reference number 28. The column 28 is formed of a suitable metal such as brass and, provides a relatively large mass for supporting the remaining components of the transmitter unit 10 in such manner that these components are relatively immune to shock and vibration problems. The extreme outer end of the boss 27 is externally threaded as indicated at 27a in order to receive a suitable fitting carried upon a conduit or piping for supplying fluid to the interior of the column 28 through a fluid passage 29 defined by an axial opening passing only part way through the column. Since the column 28 supports both the Bourdon tube and the balance beam assembly 14, as described more fully below, stresses applied to the column either by temperature variations or by the piping connected to the portion 27a do not introduce errors into the balance beam assembly because such stresses do not produce relative movement between the tip of the Bourdon tube and the component parts of the balance assembly. The column 28 further comprises a lower mounting flange 30 having a flat bottom surface resting upon the upper surface of the base 21 and also having a plurality of tapped bores therein for receiving mounting screws 31 which function to secure the column to the base. The mounting flange 30 includes a flat supporting surface 33 (FIGS. 1 and 6) in vertical alignment with a similar supporting surface 34 formed on the upper mounting flange 32 of the column 28. A base plate 35 forming a part of the electromechanical balance unit 14 rests upon the surfaces 33 and 34. The base plate 35 is secured to the mounting flange 32 by means of a pair of machine screws 36 and is further secured to mounting flange 30 by means of an elongated clamping screw 37 having a threaded end which is received within a tapped opening in the flange 30. The screw 37 is made relatively long so that its hexagonal head is readily accessible to permit loosening the screw in the event that it becomes desirable to disassemble the balance assembly 14 from the column 28.

The fluid passage 29, as is best shown in FIG. 3, is connected to a transverse opening 39 which terminates at a flat, recessed side portion of the column 28, this side portion being identified by the reference numeral 38. The Bourdon tube 15, which may be formed of bronze, is suitably secured to the flat portion 38 as, for example, by means of a silver brazing and this tube includes a central opening 40 aligned with the opening 39 so that the Bourdon tube 15 is exposed to the input fluid delivered to the column 28. The Bourdon tube 15 is mounted in a horizontal position and is spaced from but extends around a substantial portion of the interior of the upper cover 20.

The free end 16 of the Bourdon tube 15 is, therefore, moved in response to such changes in conditions of the fluid flowing through the passageway 29 and the opening 40 as pressure, temperature, rate of flow and the like. The free end 16 carries a zero adjusting mechanism identified by reference numeral 42 and best shown in FIGS. 1, 3 and 7. Specifically, the zero adjusting mechanism comprises a plate 43 suitably secured to the free end 16 of the Bourdon tube in any suitable manner, as, for example, by silver brazing. A somewhat V-shaped mounting bracket 44 is attached to the plate 43 by means of machine screws 45. The mounting bracket includes a first leg portion 44a having a notch or opening 46 formed centrally along its outer edge portion and a second leg 44b having a central opening 47 therein for accommodating an adjusting screw 48. The leg 44b also includes a pair of spaced apart apertures 49 disposed on opposite sides of the opening 47 for receiving ears 50 formed upon a U-shaped take-off arm 51 which extends outwardly from the leg 44b of the bracket. The take-off arm 51 is provided with an internally threaded opening in its bight portion for the purpose of receiving the stem of the adjusting screw 48. A coil spring 52 encircling the stem of the adjusting screw 48 is disposed between the leg 44b and the bight portion of the take-off arm 51, thereby urging the take-off arm outwardly from the leg 44b in a direction extending axially of the adjusting screw 48. The adjusting screw 48 may be turned in order to move the take-off arm 51 axially of the screw and the take-off arm is guided during the described movement by the coaction between the ears 50 and the apertures 49.

The coil spring 52 is relatively heavy and, hence, prevents axial movement of the take-off arm 51 except that produced by adjustment of the screw 48 and, as a result, this spring prevents slop or undesired relative movement between the parts of the zero adjusting mechanism. The spring 52 includes an end portion 52a (FIG. 3) seated within a suitable aperture in the leg 44b of the mounting bracket 44 and further includes a second end portion 52b (FIG. 1) which is biased against the bight portion of the take-off arm 51. The spring 52 is wound around the screw 48 several turns in order to provide a relatively high biasing force tending to rotate the take-off arm 51 about its longitudinal axis. Such rotation is limited by the coaction between the ears 50 and the apertures 49. The force exerted by the spring 52 on the arm 51 is sufficient to hold the ears 50 against the walls defining the apertures 49 even while the screw 48 is being turned in a direction tending to move the ears away from the aperture walls. Thus, the spring 52 serves to take up rotary backlash incident to screw adjustment and at the same time the spring acts as a compression spring to absorb backlash in the longitudinal direction, thus preventing error producing relative movement between the parts of the zero adjusting mechanism. The ears 50 and the apertures 49, of course, function to prevent the take-off arm 51 from rotating as the adjusting screw is turned. The notch 46 in the leg 44a permits access to the head of the screw 48 by means of a screw driver or the like in order to permit the above described adjustment.

A coil spring 54 is connected between the zero adjusting mechanism 42 and the balance beam assembly 14 for the purpose of transmitting to the balance beam of the assembly 14 forces developed either by the movement of the tip 16 of the Bourdon tube or by the movement of the take-off arm 51. Specifically, one end 54a of the loading spring 54 is connected to the take-off arm 51 by means of a spring retaining screw 55 which is threaded into one side of the arm 51. A suitable washer 56 may be interposed between the arm 51 and the end 54a of the spring 54 to facilitate the connection.

The base member 35 which, as previously mentioned, is mounted upon the column 28 by means of screws 36 and 37 functions to support the magnetic structure of the balance unit 14 and also supports the deflectable beam of the balance unit and the electrical circuit components associated therewith so that a rugged, compact structure is provided, wherein the parts may be readily assembled with a minimum number of mechanical tolerances while at the same time the balance unit is rendered relatively insensitive to changes in ambient temperature and the attendant expansion and contraction of the metal parts associated with the balance unit. And, as mentioned previously, the balance unit is also rendered insensitive to stresses applied to the mounting column 28 by the fluid inlet piping and the like. More particularly, as illustrated in FIGS. 4 and 6, a substantially U-shaped member 58 is secured to the base 35 by means of depending attaching lugs 59 formed upon the legs of the U-shaped member 58 and extending through suitable openings 60 in the base member so that the ends of these lugs may be peened over in order to assemble the U-shaped member 58 upon the base 35. A cylindrical magnet 61 is secured to the top wall or bight portion 58a of the U-shaped member 58 by means of a bolt 62 which extends downwardly through the core 61 and into a cylindrical pole piece 63 so that the core 61 and the pole piece 63 are held in assembled position on the bottom of the wall 58a. The base 35 is provided with an opening 64 the edge or boundary of which cooperates with the pole piece 63 to define an annular air gap 65 (FIG. 5) within which a concentrated magnetic field is developed, it being understood that the magnetic circuit is completed through the base 35 and through the walls of the U-shaped member 58 to the core 61.

In order to mount the deflectable beam 70 of the balance unit 14, there is provided a bracket 71 which is secured to the base 35 by means of a pair of screws 72 and is provided with flange portion 73 extending at a right angle from its horizontal leg 74 as is clearly illustrated in FIGS. 5 and 8. As is best shown in FIG. 8, the beam 70 is provided with a pair of horizontal mounting flanges 75 and 76 and a pair of vertically extending mounting flanges 77 and 78, each of these flanges being provided with a central opening. To support the beam 70, resilient mounting elements 80 and 81 are respectively connected to the flange portions 75 and 76 of the beam and resilient mounting elements 82 and 83 are respectively connected to the flange portions 77 and 78 of the beam. The resilient elements 80, 81, 82 and 83 are each provided with enlarged end portions which are clamped to the corresponding flange portions of the beam 70 and the supporting bracket 71. More particularly, the forward end portions 84 and 85 of the mounting elements 80 and 81 are clamped between the under side of the mounting flanges 75 and 76 and the upper surface of a solid bar member 86 by means of large headed rivets 87 and 88 which extend through aligned openings in the bar 86, in the end portions 84 and 85 and in the horizontal mounting flanges 75 and 76. Rear end portions 89 of the horizontal mounting elements 80 and 81 are clamped between the upper surface of the horizontal leg 74 of the mounting bracket 71 and the underside of a flat clamping member 90 by means of screws 91 which pass through aligned apertures in the clamping plate 90 and in the rear portion 89 and are accommodated within tapped openings 92 in the mounting bracket 71. The bottom end portions 93 of the vertical mounting elements 82 and 83 are clamped between the right angle flange portion 73 of the mounting bracket and a flat clamping member 94 by means of screws 95. The upper end portions 97 of the vertical mounting elements 82 and 83 are clamped between the mounting flanges 77 and 78 of the beam 70 and a flat clamping member 98 by means of large headed rivets 99 which are inserted through aligned apertures in these elements. It will be observed that the narrow central portions of the resilient mounting elements 80, 81, 82 and 83 are offset with respect to the center lines of the end portions of these elements and the end portions of each pair of elements are oppositely disposed so as to provide a compact, crossed flexure mounting arrangement wherein the end portions of each pair of resilient elements are positioned in a common plane with respect to the axis of the beam 70. The intermediate portion of the beam 70 is provided with a trough-like portion 100 for increased rigidity of the beam and the beam is also provided with an enlarged, flat end portion 101 which acts as a planar control element of the balance unit since it carries the feed-back coil of the oscillator circuit as described more fully hereinafter.

In order to balance the beam 70 statically about its rotational axis in one plane, there is provided a large headed screw 102 (FIG. 5) which extends through a clearance opening 103 in the beam 70 and threads into a central opening 104 extending transversely of the bar 86. A similar screw 105 is threaded into an aperture 106 in the bar 86 in order to provide for adjustment of the static balance of the beam 70 in a plane at right angles to the first. After the screws 102 and 105 have been adjusted to attain static balance of the beam 70 so that the center of gravity of the beam coincides with its center of rotation, these screws are held in place by means of spring wire retainers 107 and 108, respectively (FIGS. 4 and 6), which engage the threads of the screws 102 and 105, respectively, and apply a side thrust thereon to lock the same in their adjusted positions. The spring wire retainer 107 has its opposed ends disposed within notches 109 and 110 formed in the edge portion 112 of the trough 100 of the balance beam 70 while the spring wire retainer 108 has one of its end portions carried within the notch 109 and its other end portion inserted through a relatively small aperture 111 in the horizontal mounting flange 75 of the beam 70.

The beam 70 is preferably made of aluminum in order to reduce the inertia effects of this beam. The bar 86 is also preferably constructed of aluminum so as to have the same characteristics as the beam 70 and, hence, acts as a counterweight to balance the weight of the end portion 101 of the beam 70. It will be noted that the bar 86 and the screws 102 and 105 are all mounted very close to the pivotal axis of the balance beam 70 so that inertia effects, which vary as a function of the square of the distance from the pivotal axis, are relatively small. The planar end portion 101 of the beam, on the other hand, is positioned as far from the pivotal axis as possible while maintaining a compact structure so that a high torque to inertia ratio is achieved.

To complete the connection between the zero adjusting mechanism 42 and the balance beam assembly 14, the end 54b of the coil spring 54 is secured to the bar 86 by means of a set screw 114 which is threaded into a tapped bore 115 in the bar. By this arrangement, adjustment of the zero adjusting mechanism 42 by turning the screw 48 alters the force applied by the loading spring 54 to the balance beam 70 of the balance assembly without, at the same time, inducing friction producing movement between the parts of the balance beam. Thus, the balance assembly 14 may be zero adjusted in a relatively simple manner merely by altering the force applied to the balance beam without at the same time incurring the usual losses due to friction.

It has been found that the Bourdon tube 15 generally weakens at a rate of approximately 2.2 percent per 100 degrees Fahrenheit increase in temperature and as a result of increasing temperature the tip portion 16 of the tube is deflected to a greater extent for a given internal pressure. Since the loading spring 54 is made of the same material as the Bourdon tube it weakens at the same rate. The weakening of the spring compensates for the increased expansion of the Bourdon tube and the two described effects tend to cancel each other so that the balance beam 70 is rendered relatively insensitive to changes in the temperature of the ambient within the transmitter unit 10.

Considering now the details of the oscillator circuit 13 and referring particularly to FIGS. 5 and 6, it will be observed that a large majority of the components making up this circuit are mounted upon a printed circuit board 120 which is supported upon spacers 121 surrounding a plurality of mounting screws 122. The spacers 121 are interposed between the base 35 of the balance unit and the printed circuit board 120 and each of these spacers, as is best illustrated in FIG. 6, includes a cylindrical sleeve portion 123 extending through an aperture 124 in the base 35 which sleeve portions are peened over in order to secure the spacers to the base. The mounting screws 122 pass through apertures 125 in the printed circuit board 120 and are threaded into the spacers 121, thereby to complete the assembly of the printed circuit board 120 upon the base 35.

An oscillator coil 127 is formed on the surface 128 of the printed circuit board by any suitable printed circuit technique, the coil 127 being in the form of a flat, spiral wound, ribbon-like conductor of the type clearly shown and described in the above identified application Serial No. 616,485. The inner end of the printed circuit coil 127 is connected to a central eyelet 129 while the outer end of the coil is connected to a similar eyelet not shown in the drawings, these eyelets extending through the board 120 so that suitable connections can be made to the coil from surface 130 of the board. The planar end portion 101 of the beam 70 is provided with a central aperture 101a which is dimensioned to provide clearance for the central eyelet 129 and permits the end portion 101 to be moved relatively close to the oscillator coil 127 without short circuiting the connections. The surface 130 of the board 120 also has disposed thereon the electrical components of the oscillator circuit such, for example, as a plurality of condensers, a plurality of resistors, a potentiometer 140 and an inductor 141 (FIG. 3) all of which will be described more fully hereinafter. These circuit components are connected to suitable terminals and conducting regions formed on the printed circuit board in conventional manner in order to complete the oscillator circuit 13 in the manner shown in FIG. 9.

For the purpose of supporting a vacuum tube 143 forming the heart of the oscillator circuit 13, a mounting block 142 is secured to the printed circuit board 120. Specifically, the mounting block carries a vacuum tube socket (not shown) and includes mounting flanges 144 and 145 for receiving mounting screws 146 to hold the block 142 in position. The vacuum tube 143 is enclosed within a conventional vacuum tube shield 147 which is detachably secured to the vacuum tube socket and to the block 142 in conventional manner. Circuit connections from the vacuum tube socket terminals to the printed circuit board 140 are made via conductors connected to terminals 148 shown in FIG. 2. The cable 11 referred to above contains only three conductors, these being identified as 149, 150 and 151 and being respectively secured to terminals 142, 153 and 154 formed on the printed circuit board 120. These conductors extend to the remote station 12 as mentioned previously.

As described in detail in the above identified application Serial No. 616,485, the conductors of the printed circuit oscillator coil 127 are preferably in the form of flat, ribbon-like elements having a width many times greater than the thickness thereof so that the fields set up surrounding the conducting portions of the coil due to the current flow therethrough are concentrated in a direction extending transversely of the board 120 with the result that the planar end portion 101 of the beam 70 has considerable influence on these fields and can be brought extremely close to the surface 128 of the board 120 so as to produce a relatively large change in inductance of the coil 127 for a given movement of the end portion 101 in a direction extending perpendicular to the plane of this end portion. As indicated above, the beam 70 and its end portion 101 are made of aluminum so that the end portion acts as a shorted turn to produce a relatively large change in the inductance of the coil 127 for a given increment of movement of beam 70. Also, the individual turns of the coil 127 are rectangular so that a substantial area is enclosed by each turn and the coil has a maximum inductance per unit area. With this arrangement a planar control element of relatively small area, weight and inertia can be employed to obtain the desired change in inductance. Preferably, the exposed portions of the conductor elements of the coil 127 are gold plated so as to provide lower conductor resistance at the oscillator operating frequency of 30 megacycles. With such plating and a coil having the configuration described above, a relatively high Q coil is provided with the result that an extremely sensitive balance unit is formed.

In order to limit movement of the end portion 101 of the beam 70 there is provided a stop pin 160 which, as is best shown in FIG. 5, is fixedly secured near the edge of the base 35. Movement of the beam 70 toward the printed circuit board 120 is limited by means of an adjustable screw 161 which threads through a nut 162 secured to the printed circuit board 120 and extends through the board 120 so that its end portion limits the movement of the beam 70 by engaging the trough 100.

In order to enclose the elements of the balance beam assembly 14 there is provided a housing 163 which has its bottom edge seated against the surface 128 of the printed circuit board 120 and which is held in position by means of a machine screw 164 passing through the top wall of the housing 163 and threaded into a tapped bore 164 (FIG. 6) defined in the top wall or bight portion 58a of the U-shaped member 58. The housing 163 is provided with a pair of guide lugs 166 fitting within appropriate notches 167 and a slot (not shown) in the printed circuit board 120 thereby preventing movement of the housing. The top wall of the housing 163 is provided with an opening 163a through which the end portion 54a of the load spring 54 passes to the zero adjusting mechanism 42. The side walls of the housing 163 include notches or recesses 165, which fit over integral extensions formed on the base 35.

The balance unit 14 is further enclosed by means of a protective housing 168 secured to the surface 130 of the printed circuit board 120 by means of attaching screws 169. The housing 168, as is best shown in FIGS. 5 and 6, encloses the static balancing screw 102 of the balance unit and also protects the other components of the balance unit which are disposed adjacent this screw.

Considering now the electrical circuit shown in FIG. 9, the outer end or terminal of the oscillator coil 127 is connected through a condenser 133 to the interconnected control grids of parallel connected triode oscillator tubes comprising both sections of the double triode tube 143 mounted upon the block 142. Specifically, the right hand section of the tube 143 is connected in parallel with the left hand section, and to this end, the anodes of both sections are connected directly together and the same is true of the cathodes and the control grids. The center terminal 129 of the oscillator coil 127 is connected through a condenser 131 to the interconnected cathodes of the two sections of the tube 143 and a tuning condenser 132 is connected across the series combination of the oscillator coil 127 and the condenser 131 in order to provide the necessary oscillator grid tank circuit. A grid leak resistor 139, which is preferably mounted upon the block 142, is disposed between the grids and cathodes of the two sections of the tube 143, thereby to provide the necessary path for grid current flow. The interconnected anodes of the two sections of the tube 143 are connected through the plate inductor 141 to the output or B+ terminal 153, which, as previously indicated, is in turn connected to conductor 150 of the cable 11. The conductor 150 is connected through load circuit 17 of the type previously described to the B+ terminal of a power supply 170 located at the remote station 12. The interconnected cathodes of the tube section are connected through a condenser 135 to the terminal 153 in order to pass A.C. currents directly from the plate circuit to the cathode circuit of the oscillator. Heater current for the filament of the tube 143 is supplied by the power supply 170 at the remote station via conductors 149 and 151 to the terminals 152 and 154, respectively. The filament winding of the tube 143 is connected directly across the terminals 152 and 154. Conductor 151 is also connected at the power supply 170 to the B— terminal of the plate voltage supply, thus providing a common reference potential between the remote station 12 and the transmitter unit 10. Condensers 134 and 136 are connected between the heater conductors and the interconnected cathodes of the tube sections for purposes of isolation. In addition, condenser 137 is connected between the interconnected cathodes of the tube sections and ground to provide for A.C. bypass while a very large isolating resistor 138 is connected between the B— terminal 154 and ground as indicated at 171. The space current flow through both sections of the oscillator tube 143 passes through signal connector 172 to a terminal 173 which is, in turn, connected to the variable tap or movable arm 174 of the span potentiometer 140. The opposed ends of the winding or slide wire of the latter potentiometer are respectively connected to terminals 175 and 176 with terminal 176 being further connected through fixed resistor 177 to the B— terminal 154.

In order to apply a force to the balance beam 70 in opposition to the torque exerted thereon through the movement of the Bourdon tube 15, there is provided a feedback coil 180 which is supported upon the planar end portion 101 of the beam. As is best illustrated in FIG. 5, the coil 180 extends into the annular air gap 65 and is adapted to be moved within this gap when the beam 70 is deflected. One end of the feedback coil 180 is connected to the terminal 175 while the other end of this coil is connected to B— terminal 154. Thus, the D.C. space current from the oscillator tube flows through conductor 172 to terminal 173 at which point the current is confronted by parallel paths, one such path being through a portion of the winding of the span potentiometer 140 and through resistor 177 and the other such path being through the remaining portion of the winding of the span potentiometer and through the feedback coil 180. The current flowing through these two parallel paths is then recombined in conductor 181 and flows to the B— terminal 154 and over conductor 151 to the power supply 170 at the remote station 12. The B+ terminal of the power supply is connected through the load 17 and conductor 150 to the B+ terminal 153 at the transmitter unit 10 and through plate coil 141 to the interconnected anodes of the two sections of the oscillator tube 143, thus completing the current path. If the inductance of the oscillator coil 127 is varied in response to deflection of the beam 70, the current flow through the above described parallel circuit is altered in order to change the current flow through the oscillator feedback coil 180 and, hence, to apply a force to the beam 70 in opposition to the force applied by the expansion or contraction of the tip 16 of the Bourdon tube 15. It will be observed that the branch of the parallel circuit including the resistor 177 shunts a portion of the output current around the oscillator coil 180 and the values of the resistances in the feedback circuit may be so chosen as to provide the desired feedback current flow through the coil 180.

In accordance with a particular embodiment of the present invention, it has been found that a range of load current between 1 milliampere and 5 milliamperes for full movement of the tip 16 of the Bourdon tube 15 is sufficient to effect the desired control or other action at the load circuit 17. In this connection it will be recognized that different Bourdon tubes produce different deflections of their tip portions 16 for given pressure or temperature variations and these differences are preferably compensated for electrically by adjustment of the oscillator circuit. To provide the necessary compensation, a jumper may be connected between the terminal 173 and either of the terminals 175 or 176 in order to provide a coarse span adjustment so that the output current is maintained between the desired range of 1 to 5 milliamperes. The effect of connecting the jumper is, of course, to alter the ratio of resistances of the two branches of the parallel circuit, that is, to change the resistance of the branch which includes the oscillator coil 180 and at the same time to change the resistance of the branch which includes the fixed resistor 177 thereby to alter the portion of space current which is diverted around the oscillator feedback coil 180. A fine span adjustment is effected by altering the position of the movable tap 174 of the span potentiometer 140 in order to change the relative resistances in the two branches of the parallel circuit.

In accordance with the particular embodiment of the invention referred to above, the component elements of the oscillator circuit as listed in the following table were found to provide satisfactory results. It should be understood that the values of these components are given merely for purposes of explanation and that other values may be selected by those skilled in the art without departing from the present invention.

| | |
|---|---|
| Resistor 139 | 1 megohm. |
| Resistor 177 | 133 ohms. |
| Resistor 138 | 3.3 megohms. |
| Capacitor 131 | 1500 micromicrofarads. |
| Capacitor 132 | 24 micromicrofarads. |
| Capacitor 133 | 62 micromicrofarads. |
| Capacitor 137 | 1500 micromicrofarads. |
| Capacitor 135 | 1500 micromicrofarads. |
| Capacitor 136 | 1500 micromicrofarads. |
| Capacitor 134 | 1500 micromicrofarads. |
| Tube 143 | Type 12 AT 7. |
| Potentiometer 140 | 165 ohms. |
| Plate supply | 125 volts between conductors 150 and 151. |

With the circuit values indicated above, the desired range of output current can be achieved by the coarse and fine span adjustments previously described. After the span adjustment has been made, the system may be zeroed either with a known input or in the absence of an input by adjustment of the screw 48 in the zero adjusting mechanism 42. The system is thus balanced so that the force developed by current flow through the feedback coil 180 opposes the input force supplied through load spring 54. The load circuit, of course, responds to the change in load current caused by the deflection of the beam 70 required to maintain the necessary balance. Moreover, all of these results are achieved while eliminating the use of a bridge circuit in the oscillator, thus reducing the number of component parts required and, at the same time, avoiding the inherent disadvantages of a bridge circuit with respect to difficulties in obtaining a null and the like. The use of a cable containing only three conductors reduces the cost of the system while, at the same time, permitting use of a common D.C. control for the transmitter unit 10 and the equipment at the remote station 12. These results primarily flow from the use of a system wherein the oscillator tube or tubes, the load circuit, the power supply and the feedback circuit are all connected in series.

Considering now the manner is which the feedback coil 180 is mounted upon the beam 70, this coil is wound upon a coil form 182 which takes the form of a thin sleeve of aluminum cemented to a spacer 183 of insulating material. The spacer 183 is, in turn, cemented to the surface of the planar and portion 101 of the beam 70. The coil form 182 is formed of aluminum so that it acts as a shorted turn and, since this coil form is positioned within the air gap 65, it provides a damping action and at the same time furnishes a support for the feedback coil 180. The damping action provided by the aluminum coil form 182 effects increased stability of the transmitter unit 10 and permits the use of circuits having higher gain and sensitivity. The oscillator circuit 13 illustrated in FIG. 9 is much more sensitive than the corresponding oscillator circuit of the balance unit shown in the above-identified application Serial No. 616,485 and, as a result, a deeper air gap 65 may be employed which, in turn, permits a greater number of turns on the feedback coil 180. As a result, a much smaller deflection of the balance beam 70 is required in order to produce a given change in the output current flowing to the load 17. Thus, it will be observed that the sensitivity of the transmitter unit 10 of the present invention is considerably higher than that of the prior art units. The feedback coil 180 is wound so that it has a length substantially greater than the depth of the air gap 65 and, as a result, throughout the range of movement of the beam 70 between the limiting positions established by the stops 160 and 161 substantially the same number of turns of the feedback coil 180 are positioned within the air gap 65 and the force applied to the beam 70 by virtue of the current flow through the feedback coil is linearly related to the feedback current over the entire range of the instrument.

The winding of the feedback coil 180 is preferably copper wire and the winding or slide wire of the span potentiometer 140 as well as the winding of wire-wound resistor 177 are formed of a copper alloy having substantially the same temperature coefficient as the winding of the feedback coil. Thus, changes in ambient temperature affect both branches of the parallel circuit in the oscillator circuit to the same extent and the current flow through the feedback coil is stabilized to a large degree despite such temperature changes.

One of the principal advantages of the present invention resides in the fact that the zero adjusting mechanism 42, the balance assembly 14 and the oscillator circuits mounted on the board 120 are all integral sub-units and can be removed relatively easily for replacement or repair. Thus, the mechanism 42 can be disassembled by removing the screws 45 and by disconnecting one end of the spring 54. The balance assembly 14 and the printed circuit board 120 can be removed as an integral unit by disconnecting the end of the load spring 54 and by removing the screws 36 and 37 and the printed circuit board and the balance assembly may be separated by removing screws 122.

In view of the foregoing description it will be recognized that the movements of the tip of the Bourdon tube and the movements of the deflectable beam are referenced to the common mounting column 28 and, as a result, these movements are not influenced by the expansion or contraction of the column due to temperature changes, are immune from stresses applied to the column via the inlet fittings, and are free from errors which might result from movements of the transmitter unit casing and other components due to shock and vibration. All of these factors contribute to a transmitter unit which provides highly accurate results not achieved by units of the prior art.

While an illustrative embodiment of the invention has been illustrated and described it will be understood that various modifications will readily occur to those skilled in this art and it is therefore contemplated by the appended claims to cover any such modifications as fall within the true spirit and scope of the invention.

What is claimed as new and is desired to be secured by Letters Patent of the United States is:

1. A transmitter unit comprising a housing, a mounting column secured to and extending into said housing, means defining a fluid passageway in said column, a movable Bourdon tube extending within said housing in a plane lying generally normal to the axis of the column, said tube having a free end and secured at its other end to said column, means defining an opening in said tube in fluid communication with said passageway so that said tube is moved by changes in conditions of a fluid flowing through said passageway and said opening, a zero adjusting mechanism mounted on the free end of said tube and including a member movable relative to the free end of the tube and also including means for moving said member, a balance beam assembly including a flat base plate mounted on said column and extending generally parallel to the axis of said column, said balance beam assembly also including a deflectable beam supported for movement upon the base plate, a spring effectively connected between the beam and the movable member of the zero adjusting mechanism for applying a force to said beam varying in accordance with movements of said tube, an oscillator circuit including component elements mounted upon a flat board secured to said base plate and extending parallel thereto, one of said elements comprising a planar inductor positioned adjacent the beam, and means including a feedback coil mounted on the beam and a magnet assembly mounted on the base plate for applying a force to said beam in opposition to the force applied through said spring.

2. A transmitter unit comprising a housing, a mounting column secured to and extending into said housing, means defining a fluid passageway in said column, a movable tube extending within said housing in a plane lying generally normal to the axis of the column, said tube having a free end and secured at its other end to said column, means defining an opening in said tube in fluid communication with said passageway so that said tube is moved by changes in conditions of a fluid flowing through said passageway and said opening, a balance beam assembly including a flat base plate mounted on said column and extending generally parallel to the axis of said column, said balance beam assembly also including a deflectable beam supported for movement upon the base plate, a spring effectively connected between the beam and the free end of the tube for applying a force to said beam varying in accordance with movements of said tube, an oscillator circuit including component elements mounted upon a flat board secured to said base plate, and extending parallel thereto, one of said elements comprising a planar inductor positioned adjacent the beam, and means including a feedback coil mounted on the beam and a magnet assembly mounted on the base plate for applying a force to said beam in opposition to the force applied through said spring.

3. A transmitter unit comprising a housing, a mounting column secured to and extending into said housing, means defining a fluid passageway in said column, an elongated movable member extending within said housing and having one end secured to said column and exposed to said passageway so that said member is moved by changes in conditions of a fluid flowing through said passageway, a zero adjusting mechanism mounted on the other end of said member and including an element movable relative to the member and also including means for moving said element, a balance beam assembly including a flat base plate mounted on said column and extending generally parallel to the axis of said column, said balance beam assembly also including a deflectable beam supported for movement upon the base plate, a spring effectively connected between the beam and the movable element of the zero adjusting mechanism for applying a force to said beam varying in accordance with movements of said member, an oscillator circuit including component elements mounted upon a flat board secured to said base plate and extending parallel thereto, one of said elements comprising a planar inductor positioned adjacent the beam, and means including a feedback coil mounted on the beam and a magnet assembly mounted on the base plate for applying a force to said beam in opposition to the force applied through said spring.

4. A transmitter unit comprising a housing, a mounting column secured to and extending into said housing, means defining a fluid passageway in said column, a movable member extending within said housing and secured at one end to said column and exposed to said passageway so that said member is moved by changes in conditions of a fluid flowing through said passageway, a balance beam assembly including a flat base plate mounted on said column extending generally parallel to the axis of said column, said balance beam assembly also including a deflectable beam supported for movement upon the base plate, a spring effectively connected between the beam and the movable member for applying a force to said beam varying in accordance with movements of said member, an oscillator circuit including component elements mounted upon a flat board secured to said base plate and extending parallel thereto, one of said elements comprising a planar inductor positioned adjacent the beam, and means including a feedback coil mounted on the beam and a magnet assembly mounted on the base plate for applying a force to said beam in opposition to the force applied through said spring.

5. A transmitter unit comprising a housing, a mounting column secured to and extending into said housing, a movable element extending within said housing and secured at one end to said column, a zero adjusting mechanism mounted on said element and including structure movable relative to element and also including means for moving said structure, a balance beam assembly including a flat base plate mounted on said column and extending generally parallel to the axis of said column, said balance beam assembly also including a deflectable beam supported for movement on said base plate, a spring effectively connected between the beam and the movable structure of the zero adjusting mechanism for applying a force to said beam varying in accordance with movements of said member, an electrical circuit including component elements mounted upon a flat board secured to said base plate and extending parallel thereto, and means including said circuit for applying a force to said beam in opposition to the force applied through said spring.

6. A transmitter unit comprising a housing, a mounting column secured to and extending into said housing, a Bourdon tube extending within said housing and secured at one end to said column, a balance beam assembly including a flat base mounted on said column and extending generally parallel to the axis of said column, said balance beam assembly also including a deflectable beam, a spring effectively connected between the beam and the tube for applying a force to said beam varying in accordance with movements of said tube, an electrical circuit including component elements mounted upon a flat board supported by said mounting column and extending parallel to said base, and means including said electrical circuit for applying a force to said beam in opposition to the force applied through said spring.

7. In a transmitter unit the combination of a housing, a mounting column secured to and extending into said housing, a Bourdon tube extending within said housing in a plane lying generally normal to the axis of the column and secured at one end to said column, a zero adjusting mechanism mounted on the tube and including structure movable relative to the tube and also including means for moving said structure, a balance beam assembly supported by said column and including a deflectable beam lying in a plane extending generally parallel to the axis of the column and a spring effectively connected between the beam and the movable structure of the zero adjusting mechanism for applying a force to said beam varying in accordance with movements of said tube.

8. A transmitter unit for developing electrical signals corresponding to an input variable, comprising a member displaceable in response to changes in the input variable, a balance beam assembly including a deflectable balance beam; means responsive to the movements of said beam for developing electrical signals varying in accordance with said movements; and mechanism connected between said balance beam and said member for transmitting to said beam forces varying in accordance with the displacements of said member, said mechanism including a coil spring effectively connected at one end to said balance beam assembly, a support fixedly mounted on said member, an arm mounted for movement on said support, means securing the other end of said spring to said arm, a rotatable adjusting screw acting between said arm and said support for adjusting the position of said arm in order to vary the force transmitted by said spring, and resilient means acting between said support and said arm and normally urging said arm away from said support to absorb longitudinal backlash resulting from adjustment of said screw and also effective to take up rotary backlash resulting from said adjustment.

9. A transmitter unit comprising a housing formed by a base detachably secured to a cover, a vertical mounting column secured to said base and extending into said housing, means defining a fluid passageway in said column, a movable Bourdon tube extending horizontally within said housing and secured at one end to said column, means defining an opening in said tube in fluid communication with said passageway so that said tube is moved by changes in conditions of a fluid flowing through said passageway and said opening, a zero adjusting mechanism mounted on the other end of said tube and including a member movable relative to the free end of the tube and also including means for moving said member, a balance beam assembly including a base plate detachably mounted on said column and also including a deflectable beam, a spring effectively connected between the beam and the movable member of the zero adjusting mechanism for applying a force to said beam varying in accordance with movements of said tube, said spring being made of the same material as the mounting column in order to compensate at least partially for temperature changes within the housing, an oscillator circuit including component elements mounted upon a printed circuit board detachably secured to said base plate, one of said elements comprising a planar inductor positioned adjacent the beam, and means including a feedback coil mounted on the beam and a magnet assembly mounted on the base plate for applying a force to said beam in opposition to the force applied through said spring.

References Cited in the file of this patent

UNITED STATES PATENTS

| | | |
|---|---|---|
| Re. 24,267 | Ostermann et al. | Jan. 22, 1957 |
| 1,885,049 | Kalle | Oct. 25, 1932 |
| 2,514,314 | Denton | July 4, 1950 |
| 2,614,163 | Roper | Oct. 14, 1952 |
| 2,791,909 | Rick | May 14, 1957 |